US010583690B2

(12) United States Patent
Xu et al.

(10) Patent No.: US 10,583,690 B2
(45) Date of Patent: Mar. 10, 2020

(54) INSTALLATION STRUCTURE FOR WHEEL AXLE ASSEMBLY AND WHEEL FORK, FRAME AND VEHICLE

(71) Applicant: BEIJING MOBIKE TECHNOLOGY CO., LTD., Beijing (CN)

(72) Inventors: Hongjun Xu, Beijing (CN); Jun Wu, Beijing (CN); Qibing Lu, Beijing (CN); Qi Zhou, Beijing (CN)

(73) Assignee: BEIJING MOBIKE TECHNOLOGY CO., LTD, Beijing (CN)

( * ) Notice: Subject to any disclaimer, the term of this patent is extended or adjusted under 35 U.S.C. 154(b) by 335 days.

(21) Appl. No.: 15/697,719

(22) Filed: Sep. 7, 2017

(65) Prior Publication Data
US 2018/0086139 A1 Mar. 29, 2018
US 2018/0354301 A9 Dec. 13, 2018

(30) Foreign Application Priority Data

Sep. 27, 2016 (CN) .......................... 2016 1 0857565
Sep. 27, 2016 (CN) .......................... 2016 1 0857665

(51) Int. Cl.
B60B 35/00 (2006.01)
B62K 25/02 (2006.01)
(Continued)

(52) U.S. Cl.
CPC .......... B60B 35/004 (2013.01); B60B 27/023 (2013.01); B62K 3/10 (2013.01);
(Continued)

(58) Field of Classification Search
CPC .......... B62L 1/00; B62L 5/006; B62M 11/02; B62M 15/00; B62K 19/30; B62K 25/005;
(Continued)

(56) References Cited

U.S. PATENT DOCUMENTS 2,011,402 A * 8/1935 Gallo ..................... B62K 13/04
280/7.1
2,197,658 A * 4/1940 Gallo ....................... B62K 9/02
280/7.1
(Continued)

FOREIGN PATENT DOCUMENTS

CN 105270561 A 1/2016

Primary Examiner — Tony H Winner
(74) Attorney, Agent, or Firm — Venable LLP; Michele V. Frank

(57) ABSTRACT

The present invention discloses an installation structure for a wheel axle assembly and a wheel fork, a frame and a vehicle. The wheel axle assembly includes a wheel axle; a first bearing, a bushing and a second wheel axle sleeved on the wheel axle successively; and a hub arranged on the outer rings of the first bearing and the second bearing, wherein the bushing is used for spacing apart the first bearing and the second bearing axially a predetermined distance, and the hub is of a sleeve shape and an end thereof arranged on the first bearing expands the outer diameter to form a flange portion for fixing and installing a wheel; and the wheel fork includes a wheel fork body and a frame connection portion formed on an end of the wheel fork body and forming an L shape with the wheel fork body for connecting to a frame, and the wheel axle is fixed on the other end of the wheel fork body in a direction perpendicular to the rim center plane of the wheel.

15 Claims, 5 Drawing Sheets

(51) Int. Cl.
  *B62K 25/00* (2006.01)
  *B62K 19/30* (2006.01)
  *B60B 27/02* (2006.01)
  *B62K 3/10* (2006.01)
  *B62K 19/18* (2006.01)

(52) U.S. Cl.
  CPC .............. *B62K 19/18* (2013.01); *B62K 19/30* (2013.01); *B62K 25/005* (2013.01); *B62K 25/02* (2013.01)

(58) Field of Classification Search
  CPC ..... B62K 25/02; B60B 35/004; B60B 37/023; B60B 37/02; B60B 37/10
  USPC ............ 301/111.04, 111.06, 111.01; 280/288
  See application file for complete search history.

(56) References Cited

U.S. PATENT DOCUMENTS

| | | | | |
|---|---|---|---|---|
| 2,809,870 A * | 10/1957 | Youngberg | ........... | B60B 7/0013 301/111.06 |
| 3,124,391 A * | 3/1964 | Dishman | ................. | C09B 29/20 534/581 |
| 4,170,369 A * | 10/1979 | Strutman | ............... | B62K 21/02 188/26 |
| 4,540,062 A * | 9/1985 | Kashiwai | ............... | B62K 25/04 180/227 |
| 4,733,757 A * | 3/1988 | Hayashi | .................... | B62L 1/00 188/181 A |
| 4,889,205 A * | 12/1989 | Yoshimi | ............... | B62K 25/005 180/227 |
| 5,042,609 A * | 8/1991 | Krispler | ............... | B62K 21/005 180/219 |
| 5,201,236 A * | 4/1993 | Nagano | ..................... | B62L 3/00 188/24.14 |
| 5,209,319 A * | 5/1993 | Buell | .................. | B62K 25/005 180/219 |
| 5,240,087 A * | 8/1993 | Parker | ..................... | B62M 9/16 180/227 |
| 5,417,305 A * | 5/1995 | Parker | .................... | B62K 21/02 180/219 |
| 5,452,381 A * | 9/1995 | Guerra | .................. | B60B 27/023 301/105.1 |
| 6,193,323 B1 * | 2/2001 | Lin | ....................... | B60B 27/026 301/110.5 |
| 6,474,432 B1 * | 11/2002 | Schmidt | ................. | B62K 21/02 180/209 |
| 6,951,344 B2 * | 10/2005 | De Oliveira | ............. | B62K 9/00 280/274 |
| 7,044,252 B1 * | 5/2006 | Bertrand | ................ | B62K 11/06 180/219 |
| 7,793,960 B2 * | 9/2010 | Sherman | ................... | B62K 3/04 280/288 |
| 8,820,853 B1 * | 9/2014 | Barefoot | ................ | B60B 27/06 301/110.5 |
| 2005/0252728 A1 * | 11/2005 | Fukui | ..................... | B62K 19/38 188/26 |
| 2008/0116658 A1 * | 5/2008 | Schroeder | ............. | B60B 27/026 280/276 |
| 2010/0052410 A1 * | 3/2010 | Sherman | ................... | B60B 1/06 301/55 |
| 2017/0057586 A1 * | 3/2017 | Igarashi | ................ | B62K 11/12 |

* cited by examiner

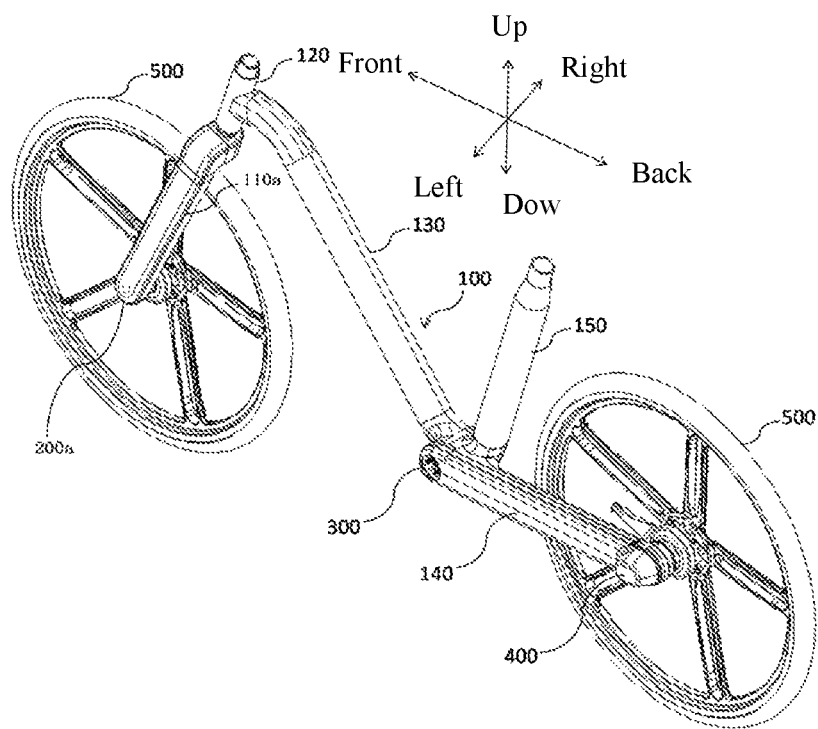
FIG. 1
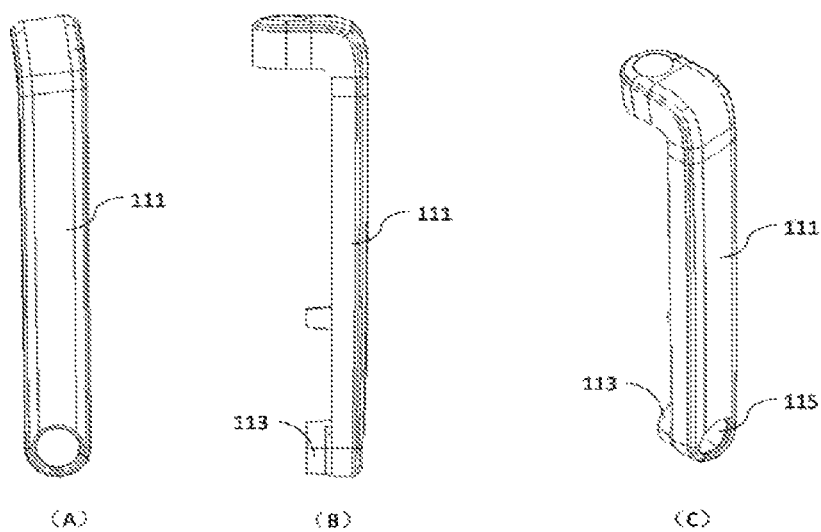
FIG. 2 - Prior Art

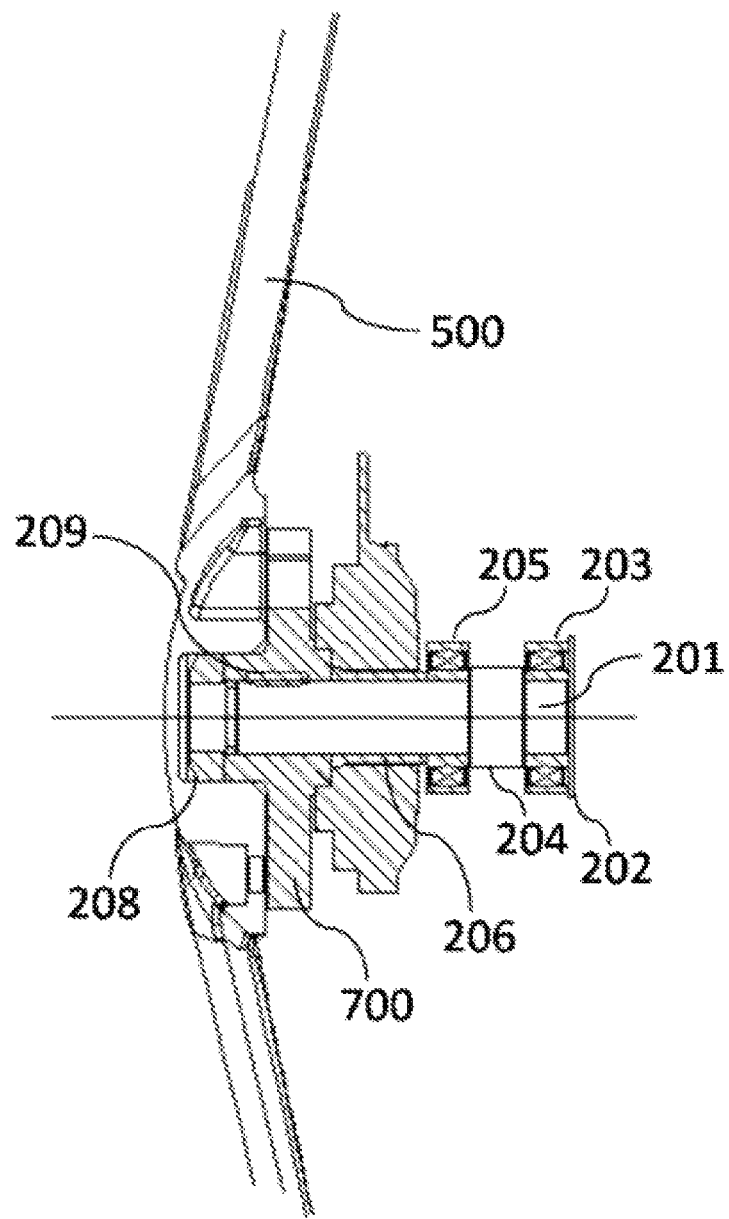
FIG. 3 - Prior Art

US 10,583,690 B2

INSTALLATION STRUCTURE FOR WHEEL AXLE ASSEMBLY AND WHEEL FORK, FRAME AND VEHICLE

CROSS REFERENCE TO RELATED APPLICATION

This application claims priority to Chinese Application No. 201610857665.3 filed on Sep. 27, 2016 and Application No. 201610857565.0 filed on Sep. 27, 2016, the contents of which are hereby incorporated by reference in their entirety.

FIELD OF THE INVENTION

The present invention relates to an installation structure for a wheel axle assembly and a wheel fork, and also relates to a frame applying the above installation structure, and further relates to a vehicle applying the above frame, such as a two-wheeler, a three-wheeler and so on.

BACKGROUND OF THE INVENTION

China is a big country for bicycle production and use. For a long time, bicycles are used as main traffic tools for short-distance outgoing within one city. For example, in the invention, filed on Sep. 29, 2015 on the Chinese Patent Office by the present applicant, with the title "Chainless Bicycle and Its Forks, Frames" (application no. 201510634705.3, referred to as background art hereafter), provided a bicycle with a single fork structure, which has an unique and beautiful shape, and a compact structure.

Therefore, there is a demand in the art that a new solution for installation structure for a wheel axle assembly and a wheel fork shall be proposed to address at least one of the problems in the prior art.

SUMMARY OF THE INVENTION

One object of this invention is to provide an installation structure for a wheel axle assembly and a wheel fork, which has a simple, firm and compact structure, and is easy to process and assemble, and has a well durability.

According to a first aspect of the present invention, there is provided an installation structure for a wheel axle assembly and a wheel fork, comprising a wheel axle assembly and a wheel fork, wherein the wheel axle assembly includes a wheel axle; a first bearing, a bush and a second bearing sleeved on the wheel axle successively; and a hub arranged on the outer rings of the first bearing and the second bearing, wherein the bush is used for spacing apart the first bearing and the second bearing axially a predetermined distance, and the hub is of a sleeve shape and an end thereof arranged on the first bearing expands the outer diameter to form a flange portion for fixing and installing a wheel; and the wheel fork includes a wheel fork body and a frame connection portion formed on an end of the wheel fork body and forming an L shape with the wheel fork body for connecting to a frame, and the wheel axle is fixed on the other end of the wheel fork body in a direction perpendicular to the rim center plane of the wheel.

Alternatively or optionally, the wheel axle and the ends of the wheel fork body are integrally formed.

Alternatively or optionally, the end of the wheel fork body form a wheel axle installation portion in an extending manner in the direction thereof; wherein along a direction perpendicular to the rim center plane of the wheel, the wheel axle installation portion is provided with a wheel axle installation hole for fixedly connecting the wheel axle.

Alternatively or optionally, the section of at least a part of the wheel axle installation hole is non-round; and at least a part of the wheel axle being fixedly assembled in the wheel axle installation holes is processed of a non-round shape corresponding thereto.

Alternatively or optionally, the wheel axle installation hole is stepped hole, and a stepped portion of the stepped hole is used for being clamped and fixed with a cap portion provided in correspondence of an end of the wheel axle.

Alternatively or optionally, the wheel axle installation hole is sized to be interference-fitted with the wheel axle.

Alternatively or optionally, the wheel fork body and the frame connection portion are integrally formed.

Alternatively or optionally, at least a plurality of reinforcement ribs is formed on the wheel fork body.

Alternatively or optionally, a space for installing a brake operating in a central braking manner is provided between the second bearing and the wheel fork in the axial direction of the wheel axle.

Alternatively or optionally, a brake operating in a roller braking manner is installed in the space, and a periphery of an end of the hub which is arranged on the second bearing is processed of a gear shape to act as an inner ring fluted disc of the brake operating in a roller braking manner.

Alternatively or optionally, the periphery of the end of the hub which is processed of a gear shape is an independently manufactured embedded member which is embedded and fixed on the hub body of the hub.

Alternatively or optionally, the installation structure further comprises a positioning member installed in a manner of clamping the first bearing with the bushing in the axial direction and not affecting the rotation of the outer ring of the first bearing.

According to another aspect of the present invention, a frame is also provided, comprising the installation structure mentioned above.

According to yet another aspect of the present invention, a vehicle applying the frame mentioned above is also provided.

Alternatively or optionally, the vehicle is a two-wheeler or a three-wheeler.

The installation structure provided in the present invention has a simple, firm and compact structure and is easy to process and assemble with good duration.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

FIG. 1 is a schematic diagram representing the entire construction of a bicycle according to an embodiment of the present invention.

FIG. 2 is a schematic diagram for describing the construction of the wheel fork in the background art, wherein FIG. 2(A) is a front view of the wheel fork, FIG. 2(B) is a left view of the wheel fork, and FIG. 2(C) is a perspective view of the wheel fork.

FIG. 3 is a section view of the wheel axle assembly in the background art.

DETAILED DESCRIPTION OF THE EMBODIMENTS

Figure 4A:
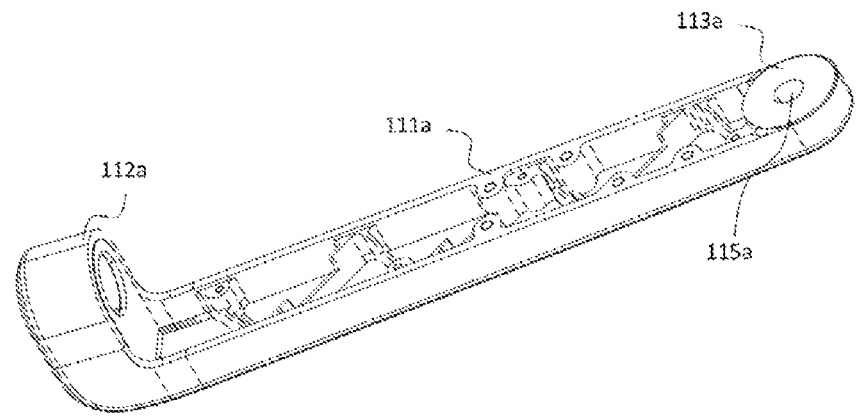
FIGS. 4(A) and 4(B) are schematic diagrams of the construction of a wheel fork according to an embodiment of the present invention.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

(The Definition of the Direction)

In the following description, the state of the bicycle shown in FIG. 1 is taken for reference, that is, the state where the bicycle stands on the floor vertically. Sometimes, the direction of the bicycle head is defined as "front", the direction of the bicycle tail is defined as "rear", the left of the bicycle when viewing the front of the bicycle head is defined as "left", the right of the bicycle when viewing the front of the bicycle head is defined as "right", the vertical upward direction is defined as "up", the vertical downward direction is defined as "down", the plane of the rim center of the wheel is defined as the rim central plane, to describe the directions and positions of various constituent structures of the bicycle.

(The Entire Structure of the Bicycle)

FIG. 1 is a diagram schematically representing the entire construction of a bicycle according to an embodiment of the present invention. As shown in FIG. 1, the bicycle according to an embodiment of the present invention mainly includes a frame 100, a wheel axle assembly 200a, a middle axle assembly 300, a rear axle assembly 400, a wheel 500, a handle, a seat, a crank and pedals, wherein the handle, the seat, the crank and the pedals are not shown. The frame 100 includes a wheel fork 110a, a head tube 120, a frame lower tube 130, an integrated underframe 140 and a seat tube 150. The wheel fork 110a may be rotatably connected to an end of the head tube 120 around the axial direction of the head tube 120. The other end of the head tube 120 is used for installing the handle (not shown). The head tube 120 is relatively fixedly connected to an end of the frame lower tube 130 in the middle. The other end of the frame lower tube 130 is relatively fixedly connected to a frame lower tube connection portion of the integrated underframe 140. An end of the seat tube 150 is relatively fixedly connected to a seat tube connection portion of the integrated underframe 140. The other end of the seat tube 150 is used for installing the seat (not shown). In addition, the integrated underframe 140 is an integrated member with functions of bottom bracket, rear lower fork and rear axle installation portion. The rear lower fork portion thereof merely exists at a single side of the rear wheel, that is, a single-fork structure. Likewise, the wheel fork 110a is also a single-fork structure, that is, merely exists at a single side of the wheel. Hereinafter, the front fork and the wheel axle assembly thereof constituting the feature of the present invention will be described in detail.

(Wheel Fork and Wheel Axle Assembly Thereof in Background Art)

Before describing the wheel fork and wheel axle assembly thereof in the present invention in detail, the structure of the wheel fork and wheel axle assembly in the background art will be first introduced briefly.

FIG. 2 is a schematic diagram for describing the construction of the front fork in the background art. FIG. 2(A) is a front view of the front fork. FIG. 2(B) is a left view of the front fork. FIG. 2(C) is a perspective view of the front fork. A wheel axle installation portion 113 which extends out in the direction of the wheel axle some distance is provided at one end of the front fork body 111 at the wheel axle side for assembling the wheel axle assembly. The structure of the wheel axle installation portion 113 can ensure an axial space for assembling the wheel axle assembly in the wheel axle installation portion and ensure that there is a sufficient separation distance between two bearings 203 and 205 which support the wheel axle 201 at two points in the axial direction.

FIG. 3 is a section view of a wheel axle assembly in the background art. As shown in FIG. 3, the wheel axle assembly includes a wheel axle 201, and a jump ring 202, a bearing 203, a shaft shoulder 204, a bearing 205, a spacer bush 206, a flange disc 700 and a positioning nut 208 arranged along the axial direction of the wheel axle 201 from one end to the other end at the side where the wheel fork is located. In addition, in order to prevent the relative rotation between the wheel axle 201 and the flange disc 700, a keyway-flat key construction 209 is also provided therebetween.

(The Wheel Fork According to an Embodiment of the Present Invention)

Figure 4B:
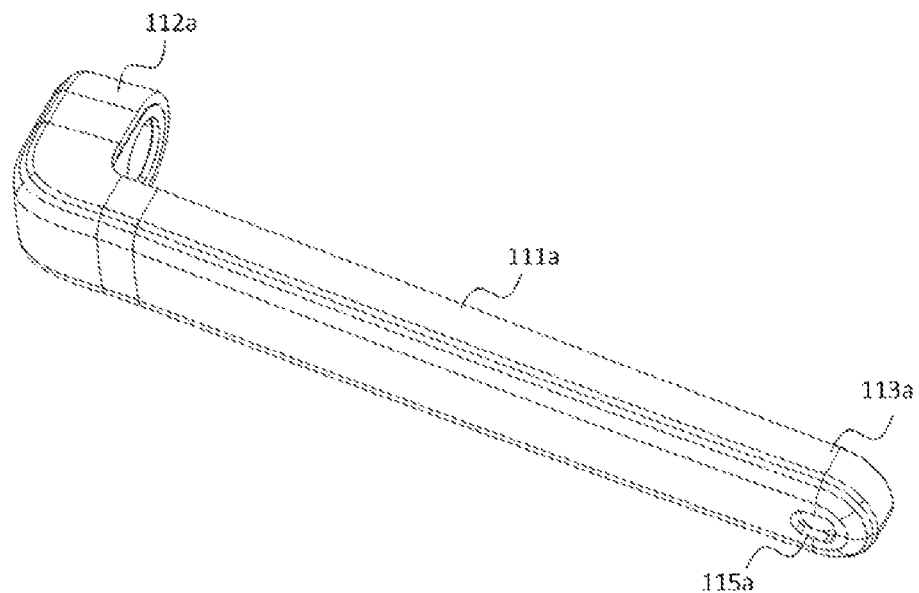

FIGS. 4(A) and 4(B) are schematic diagrams for describing the construction of the wheel fork 110a according to an embodiment of the present invention.

As shown in FIG. 4, the wheel fork 110a in the present invention is merely provided at one side of the wheel, that is, the so-called single wheel fork, entirely in an L shape. That is, it is integrally formed by the wheel fork body 111a extending in the direction parallel to the rim central plane, a head tube connection portion 112a at one end of the wheel fork body 111a extending in the direction perpendicular to the rim central plane and a wheel axle installation portion 113a formed at the other end of the wheel fork body 111a in the direction thereof. It should be noted here that being different from the wheel axle installation portion 113 of the front fork in the background art, the wheel axle installation portion in the present invention does not extend out a certain distance substantially in the wheel axle direction, and the thickness of the wheel axle installation portion is approximately equal to the entire thickness of the wheel fork body 111a. The reason for providing the wheel axle installation portion 113a so will be described hereinafter.

In addition, a connection hole for connecting the head tube 120 is provided at the head tube connection portion 112a. The head tube 120 is inserted in the connection hole and fixed relative to the wheel fork 110a by means of welding or riveting. Of course, this connection hole may not be provided. Instead, the head tube connection portion 112a of the wheel fork 110a is fixed on the head tube 120 directly by means of welding or riveting.

A wheel axle installation hole 115a is opened at the wheel axle installation portion 113a in the direction perpendicular to the rim central plane for assembling a wheel axle 201a described below.

In addition, in order to enhance the strength of the wheel fork 110a, as shown in FIG. 4, reinforcement ribs may be provided at least at a part of the inner side of the wheel fork body 111a of the wheel fork 110a.

Figure 5A:
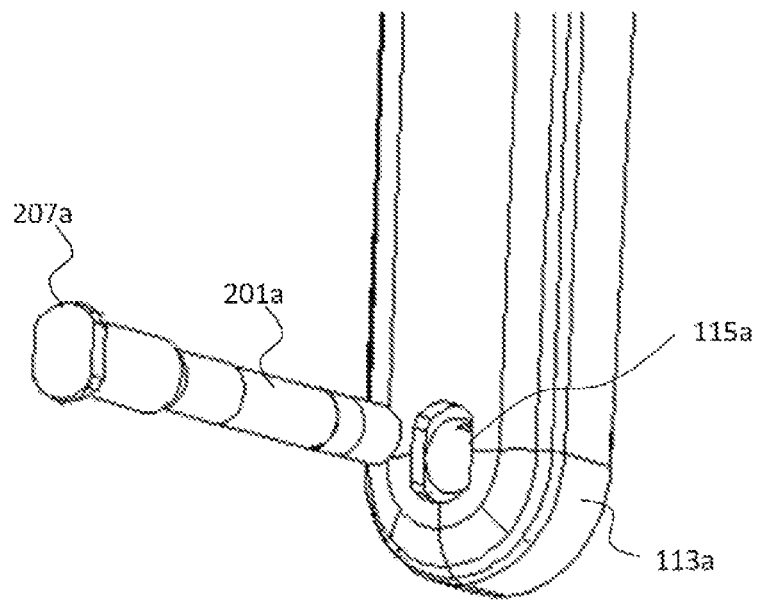
FIGS. 5(A) and 5(B) are diagrams schematically representing the assembly relationship between the wheel fork and the wheel axle according to an embodiment of the present invention.
Figure 5B:
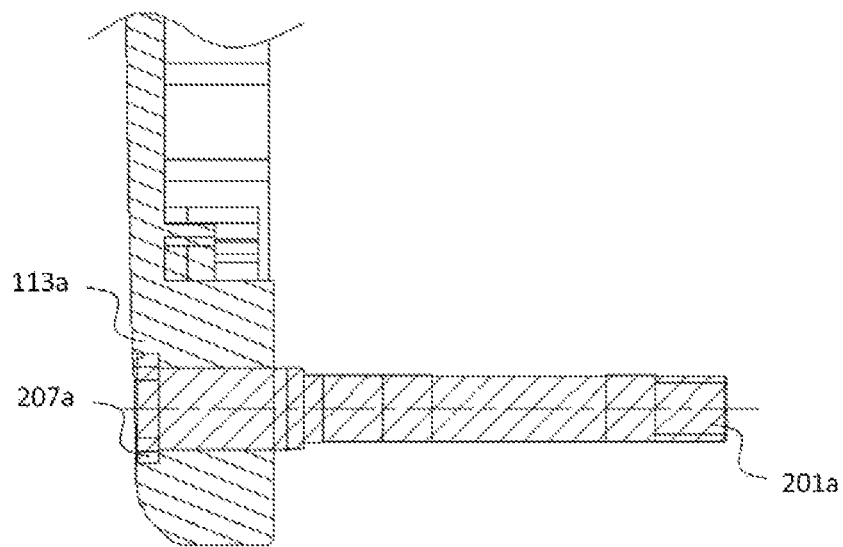

FIGS. 5(A) and 5(B) are graphs schematically representing the assembly relationship between the wheel fork 110a and the wheel axle 201a according to an embodiment of the present invention. As shown in FIG. 5(A), the wheel axle 201a is of a cylinder structure entirely and is provided at one end with a cap portion 207a for being clamped and fixed in a stepped hole of a wheel axle installation hole described below.

In addition, as shown in FIG. 5(A), a wheel axle installation hole 115a for the wheel axle 201a to pass through and fix is opened at the wheel axle installation portion 113a of the wheel fork 110a in the direction perpendicular to the rim central plane. As shown in FIG. 5(B), the wheel axle installation hole 115a is a stepped hole. The stepped portion of the stepped hole (also referred to as cap clamping and fixation portion hereafter) is clamped and fixed with the cap portion 207a provided at one end of the wheel axle so as to position the wheel axle in the axial direction.

In the present invention, the wheel axle 201a and the wheel fork 110a are relatively fixed without relative rotation. The structure for preventing relative rotation may employ any known methods for relatively fixing two members. For example, the cap portion 207a of the wheel axle 201a may be of a non-round shape, such as a long circular shape, as shown in FIG. 5(A). At the same time, the cap clamping and fixing portion of the wheel axle installation hole may be of a shape mating with the cap portion, thereby preventing relative rotation therebetween. In addition, the sections of the wheel axle installation hole and any part of the wheel axle which is inserted in the wheel axle installation hole may be of a non-round shape. Furthermore, the wheel fork and the wheel axle may be relatively fixed through a keyway-flat key structure or they may be integrally formed and so on.

(Wheel Axle Assembly According to an Embodiment of the Present Invention)

Figure 6:
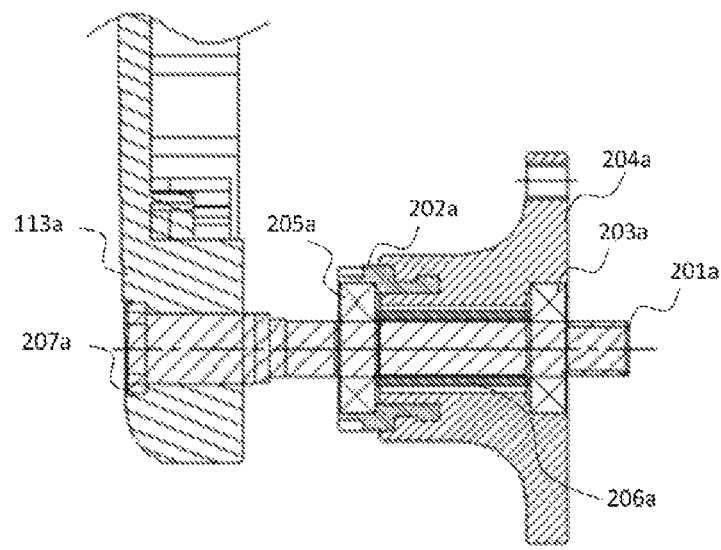
FIG. 6 is a section view of a wheel axle assembly of a non-drive wheel according to an embodiment of the present invention.

FIG. 6 is a section view of a wheel axle assembly 200a according to an embodiment of the present invention. As shown in FIG. 6, the wheel axle assembly includes a wheel axle 201a, and a bearing 203a, a bushing 206a and a bearing 205a successively sleeved on the wheel axle from a wheel installation end of the wheel axle (an opposite end provided with a cap portion), and a hub 204a arranged at the outer rings of the two bearings 203a and 205a.

Hereinafter, the assembling of the wheel axle assembly 200a will be described. After the wheel axle 201a is inserted into the wheel axle installation hole 115a and fixed from the outer side of the wheel fork 110a as mentioned before, a brake (not shown), the bearing 205a, the bushing 206a, the hub 204a and the bearing 203a are successively sleeved from the wheel installation end of the wheel axle 201a. In the present invention, the brake preferably adopts roller brake. The bearing 205a is abutted against the brake without affecting the rotation of the out ring, and the other side is abutted against by the bushing 206a, thus being positioned in the axial direction of the wheel axle 201a. Then, the hub 204a is sleeved on. The hub 204a is of a sleeve shape. One end of the hub close to the wheel fork is sleeved on the outer ring of the bearing 205a and one end thereof close to the wheel side is sleeved on the outer ring of the bearing 203a, thus being arranged between the outer rings of the bearings 205a and 203a and being capable of rotating with the outer rings of the bearings. In addition, the outer diameter of the wheel installation end of the hub 204a expands to form a flange portion which is provided circumferentially with screw holes for installing the wheel (not shown). When the wheel is installed on the flange portion, a part of the wheel is abutted against the bearing 203a without affecting the rotation of the bearing 203a, such that the bearing 203a is positioned in the axial direction. Of course, positioning elements such as screws and so on may be additionally sleeved on bearing 203a close to the wheel side to position the bearing 203a in the axial direction.

In addition, as shown in FIG. 6, when the hub 204a in this embodiment is arranged on the bearing 205a, an embedded member 202a casted in the hub body in advance is adopted. The hub is sleeved on the bearing 205a with this embedded member 202a. Also, the periphery of the portion of the embedded member 202a exposed out of the hub body is formed as gear which is used as the inner ring fluted disc of the roller brake. This embedded member of a gear shape may be manufactured independently and embedded in the hub body by means of casting, which can save manufacture costs. Of course, this embedded member may be not manufactured additionally. Instead, the end of the hub close to the wheel fork side may be directly processed into a corresponding shape. Thus, when the roller brake is assembled between the bearing 205a and the wheel fork 110a, the gear shaped portion of the hub 204a is inserted in the center of the roller brake and also functions as a center gear thereof, such that the assembling of various components on the wheel axle may be more compact, saving the assembling space of the wheel axle.

A roller brake method is employed in this embodiment. Other center braking methods such as disc brake, drum brake, contact type and so on may also be employed.

The provision of the above wheel axle assembly enables two bearings to be supported in the hub which operates as an independent component, and thus ensuring the spacing between the two bearings, such that the support force of the wheel axle is more balanced and stable and the number of components may be reduced.

An interference fit method may be employed between the wheel axle and the wheel axle installation hole of the wheel fork, such that no swing will be produced therebetween. In addition, a sliding mating method may be employed between the two bearings as well as the bushing and the wheel axle. Likewise, a sliding mating method may also be employed between the hub (embedded member) and the bearing, thus the assembling of the wheel axle assembly becomes easier.

The construction of the wheel fork in the present invention is described by taking a front fork of a bicycle as an example. However, the wheel fork in the present invention is not only suitable for two-wheel bicycles but also suitable for electric bicycles, motorcycles, three-wheel bicycles, three-wheel motorcycles and so on. That is, as long as a wheel fork is a non-drive wheel, the wheel fork in the present invention may be applied. In addition, the wheel fork is described as a single wheel fork in this embodiment. However, of course, a support arm for supporting the wheel may be provided at the other side of the wheel.

(Wheel Hub)

Figure 7:
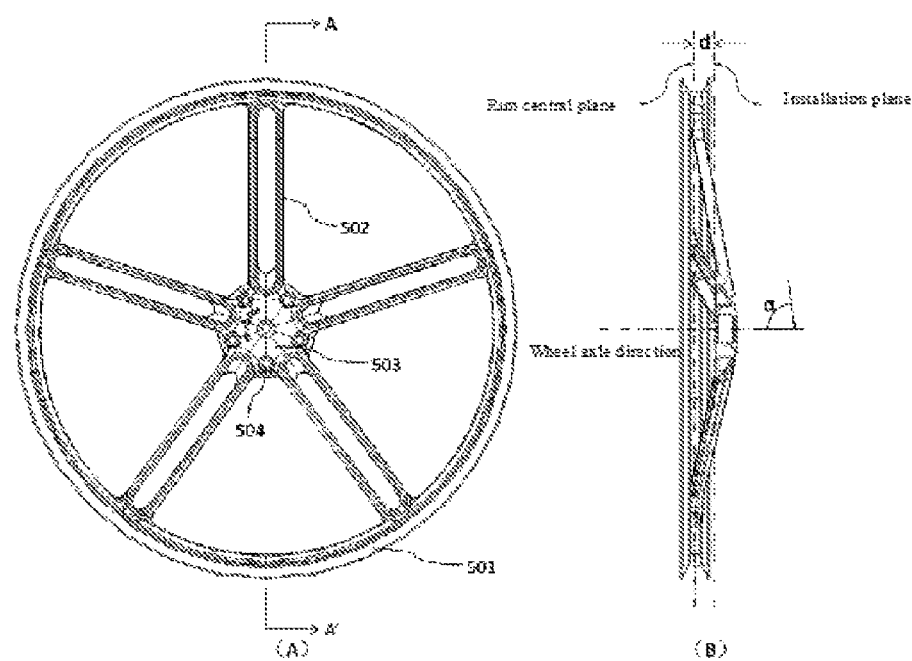
FIG. 7 is a schematic diagram representing the structure of a wheel hub of a wheel according to an embodiment of the present invention, (A) is a front view of the wheel hub, and (B) is a section view of (A) in the direction A-A'.

FIG. 7 is graph representing the structure of a wheel hub of a wheel 500 according to an embodiment of the present invention, (A) is a front view of the wheel hub, and (B) is a section view of the wheel hub in (A) in the direction A-A'(diameter).

As shown in FIG. 7(A), the wheel hub of the wheel 500 according to an embodiment of the present invention comprises a rim 501 for installing a tire, a wheel disc (installation disc) 503 at the centre of the wheel hub for installing the rim on a wheel axle (wheel axle 201a mentioned before) and a spoke 502 connected between the rim 501 and the wheel disc 503 for supporting the rim 501. The spoke 502 may be fixedly connected between the rim 501 and the wheel disc 503 as a separate component by means of welding and may also be integrally formed with the rim 501 and the wheel disc 503.

A plurality of bolt holes 504 is provided along the periphery portion of the wheel disc 503, and the positions thereof correspond to a plurality of installation holes of the flange portion of the hub 204a mentioned before respectively. The wheel 500 is installed at the wheel installation end of the wheel axle 201a by means of bolt fixing.

As shown in FIG. 7(B), the wheel hub according to an embodiment of the present invention is an eccentric wheel. The extension direction of the spoke 502 inclines at a certain angle α relative to the wheel axle direction, where a is smaller than 90 degrees. That is, the spoke does not extend along the direction perpendicular to the wheel axle. Thus, there is a positive offset d between the rim central plane (that is, the rim center) and the installation plane of the wheel disc 503, such that the rim central plane coincides with the central plane of the bicycle.

The size of the offset d may be adjusted by designing the inclination angle α of the spoke 502, and at the same time, the length of the bushing on the wheel axle 201a is designed, such that the rim central plane may be close to the center of the wheel axle as much as possible. Thus, the load of the wheel axle and the bearing may be reduced, the service life of the wheel axle and the bearing may be extended, or the requirements to the strength of the wheel axle and the bearing may be reduced.

In addition, preferably, the offset d is set such that for example, the roller brake is at the rim central plane or nearby. At this moment, the braking performance of the brake is better.

The foregoing describes embodiments of applying the wheel fork, the wheel axle assembly and the wheel hub in the present invention to a bicycle. However, the structures and connection relationships of these components may also be applied to the non-drive wheels of two-wheeler or three-wheeler such as electric bicycles, motorcycles and so on Although some specific embodiments of the present invention have been demonstrated in detail with examples, it should be understood by a person skilled in the art that the above examples are only intended to be illustrative but not to limit the scope of the present invention.

What is claimed is:

1. An installation structure for a wheel axle assembly and a wheel fork, comprising a wheel axle assembly and a wheel fork, wherein
    the wheel axle assembly includes a wheel axle; a first bearing, a bushing and a second bearing sleeved on the wheel axle successively; and a hub which operates as an independent component and is arranged on the outer rings of the first bearing and the second bearing, wherein the bushing is used for spacing apart the first bearing and the second bearing axially a predetermined distance, and the hub is of a sleeve shape and an end thereof arranged on the first bearing expands an outer diameter to form a flange portion for fixing and installing a wheel; and
    the wheel fork includes a wheel fork body and a frame connection portion formed on an end of the wheel fork body and forming an L shape with the wheel fork body for connecting to a frame, and the wheel axle is fixed on the other end of the wheel fork body in a direction perpendicular to a rim center plane of the wheel.

2. The installation structure according to claim 1, wherein the wheel axle and the other end of the wheel fork body are integrally formed.

3. The installation structure according to claim 1, wherein the other end of the wheel fork body form a wheel axle installation portion in an extending manner in a direction of the wheel fork body;
    wherein along a direction perpendicular to the rim center plane of the wheel, the wheel axle installation portion is provided with a wheel axle installation hole for fixedly connecting the wheel axle.

4. The installation structure according to claim 3, wherein a section of at least a part of the wheel axle installation hole is non-round; and at least a part of the wheel axle being fixedly assembled in the wheel axle installation hole is a non-round shape corresponding to the section.

5. The installation structure according to claim 4, wherein the wheel axle installation hole is a stepped hole, and a stepped portion of the stepped hole is used for being clamped and fixed with a cap portion provided in correspondence of an end of the wheel axle.

6. The installation structure according to claim 3, wherein the wheel axle installation hole is sized to be interference-fitted with the wheel axle.

7. The installation structure according to claim 1, wherein the wheel fork body and the frame connection portion are integrally formed.

8. The installation structure according to claim 1, wherein at least a plurality of reinforcement ribs is formed on the wheel fork body.

9. The installation structure according to claim 1, wherein a space for installing a brake operating in a central braking manner is provided between the second bearing and the wheel fork in an axial direction of the wheel axle.

10. The installation structure according to claim 9, wherein a brake operating in a roller braking manner is installed in the space, and a periphery of an end of the hub which is arranged on the second bearing is a gear shape to act as an inner ring fluted disc of the brake operating in the roller braking manner.

11. The installation structure according to claim 10, wherein the periphery of the end of the hub which is a gear shape is an independently manufactured embedded member which is embedded and fixed on a hub body of the hub.

12. The installation structure according to claim 1, further comprising a positioning member installed in a manner of clamping the first bearing with the bushing in an axial direction and not affecting a rotation of the outer ring of the first bearing.

13. A frame comprising the installation structure according to claim 1.

14. A vehicle comprising the frame according to claim 13.

15. The vehicle according to claim 14, wherein the vehicle is a two-wheeler or a three-wheeler.

* * * * *